(12) United States Patent  
Prevost et al.

(10) Patent No.: US 10,516,192 B2  
(45) Date of Patent: Dec. 24, 2019

(54) BATTERY PACK THERMAL REGULATION DEVICE

(71) Applicant: Valeo Systemes Thermiques, Le Mesnil Saint Denis (FR)

(72) Inventors: Jean-Christophe Prevost, Ligron (FR); Fabien Bireaud, Guyancourt (FR); Xavier Marchadier, Levis Saint Nom (FR); Christian Mahe, Le Tremblay sur Mauldre (FR); Rémi Tournois, Les-Essarts-le-Roi (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 64 days.

(21) Appl. No.: 15/022,426

(22) PCT Filed: Sep. 11, 2014

(86) PCT No.: PCT/EP2014/069432  
§ 371 (c)(1),  
(2) Date: May 27, 2016

(87) PCT Pub. No.: WO2015/039952  
PCT Pub. Date: Mar. 26, 2015

(65) Prior Publication Data  
US 2016/0276718 A1  Sep. 22, 2016

(30) Foreign Application Priority Data

Sep. 18, 2013 (FR) ..................................... 13 58952

(51) Int. Cl.  
*H01M 10/625* (2014.01)  
*H01M 10/6556* (2014.01)  
(Continued)

(52) U.S. Cl.  
CPC ............. *H01M 10/625* (2015.04); *B60K 1/04* (2013.01); *B60L 3/0046* (2013.01); *B60L 50/64* (2019.02);  
(Continued)

(58) Field of Classification Search  
CPC ........... H01M 10/625; H01M 10/6556; H01M 10/658; H01M 2/1077; H01M 2240/545;  
(Continued)

(56) References Cited

U.S. PATENT DOCUMENTS

2006/0214468 A1* 9/2006 Cass ................... B29C 45/1635  
296/146.16  
2010/0190049 A1  7/2010 Kawase et al.  
(Continued)

FOREIGN PATENT DOCUMENTS

DE  102009058809 A1 * 6/2011 ............ B60L 3/0046  
DE  10 2010 038681 A1  2/2012  
(Continued)

OTHER PUBLICATIONS

Morton et al. (DE 10 2012 009 889.8) which is the priority document for Morton (US 20150044540 A1).*  
(Continued)

*Primary Examiner* — Jane J Rhee  
(74) *Attorney, Agent, or Firm* — Osha Liang LLP

(57) ABSTRACT

The invention relates to a device for the thermal regulation of a motor vehicle battery pack (1) comprising at least one battery (5) contained in a housing (3), the thermal regulation device comprising: at least one heat exchanger (9) in contact with the battery (5), at least one elastic element (15) arranged in the bottom (14) of the housing (3) so as to hold the heat exchanger (9) against the battery (5). An insulator (13) is interposed between the elastic element (15) and the heat exchanger (9).

14 Claims, 6 Drawing Sheets

(51) Int. Cl.
    *H01M 10/658*   (2014.01)
    *B60L 3/00*     (2019.01)
    *B60K 1/04*     (2019.01)
    *H01M 2/10*     (2006.01)
    *B60L 58/21*    (2019.01)
    *B60L 58/26*    (2019.01)
    *B60L 50/64*    (2019.01)
    *B60K 1/00*     (2006.01)

(52) U.S. Cl.
    CPC ............... *B60L 58/21* (2019.02); *B60L 58/26* (2019.02); *H01M 2/1077* (2013.01); *H01M 10/658* (2015.04); *H01M 10/6556* (2015.04); *B60K 2001/005* (2013.01); *B60L 2240/545* (2013.01); *H01M 2220/20* (2013.01); *Y02T 10/7005* (2013.01); *Y02T 10/7061* (2013.01)

(58) Field of Classification Search
    CPC ............... H01M 2220/20; B60K 1/04; B60K 2001/005; B60L 3/0046; B60L 11/1864; B60L 11/1879; B60L 2240/545; Y02T 10/7005; Y02T 10/7061
    See application file for complete search history.

(56) References Cited

U.S. PATENT DOCUMENTS

| | | |
|---|---|---|
| 2012/0129018 A1 | 5/2012 | Eckstein et al. |
| 2013/0189558 A1 | 7/2013 | Haussmann |
| 2013/0207459 A1* | 8/2013 | Schroder ............. H01M 2/1077 307/10.1 |
| 2015/0023392 A1* | 1/2015 | Noh .......... G01K 7/22 374/185 |
| 2015/0044540 A1* | 2/2015 | Morton ............... H01M 2/1077 429/120 |

FOREIGN PATENT DOCUMENTS

| | | | | |
|---|---|---|---|---|
| DE | 102010038681 A1 | * | 2/2012 | .......... H01M 2/1083 |
| DE | 10 2011 003535 A1 | | 8/2012 | |
| DE | 10 2011 052513 A1 | | 2/2013 | |
| EP | 2388851 A1 | * | 11/2011 | ......... F28D 1/05383 |
| KR | 20150010225 A | * | 1/2015 | ............... G01K 7/22 |

OTHER PUBLICATIONS

English machine translation of Haussmann (DE 102009058809 A1) (Year: 2011).*
English machine translation of Koester et al. (DE 102010038681 A1) (Year: 2012).*
English machine translation of Herrmann et al. (EP 2388851 A1) (Year: 2011).*
International Search Report issued in PCT/EP2014/069432 dated Oct. 13, 2014 (3 pages).
Written Opinion of the International Searching Authority issued in PCT/EP2014/069432 dated Oct. 13, 2014 (6 pages).

* cited by examiner

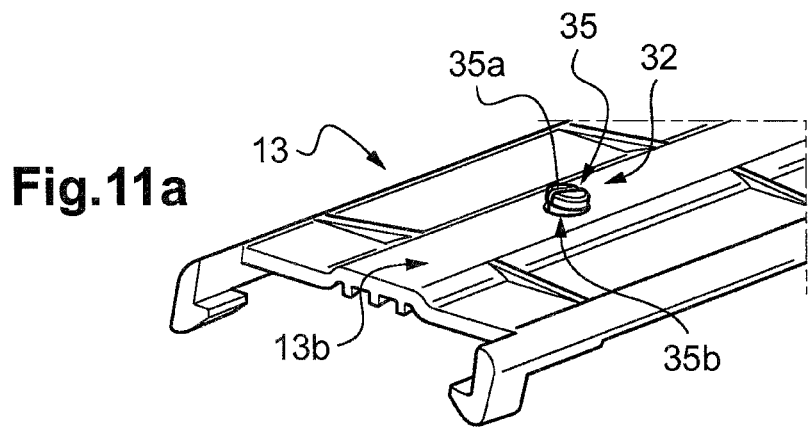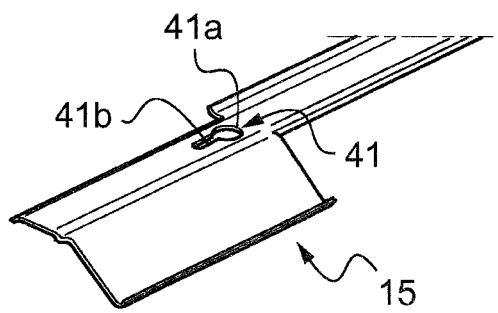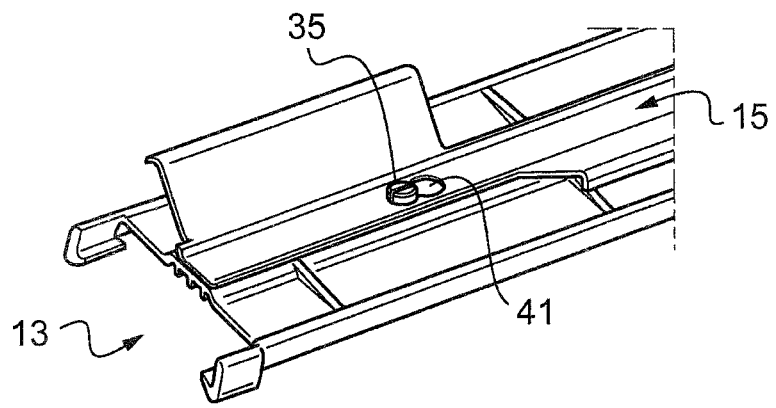

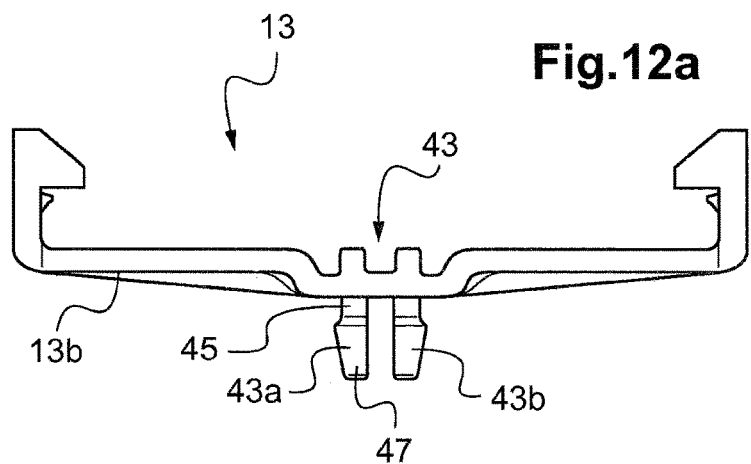
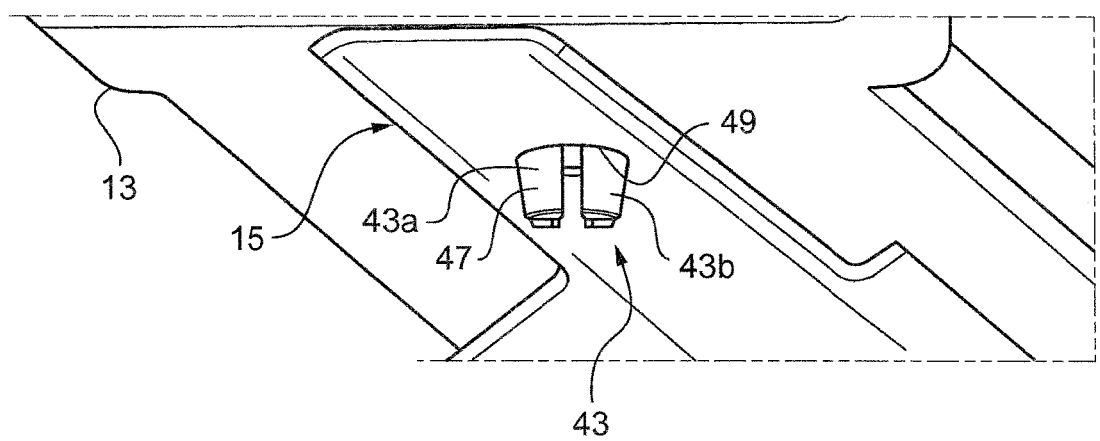

BATTERY PACK THERMAL REGULATION DEVICE

The present invention relates to a thermal regulation device for a battery pack of a motor vehicle, and more specifically to a thermal regulation device for a battery in a hybrid and/or electric vehicle, ensuring a good heat exchange between the battery and a heat exchanger.

The thermal regulation of the battery, in particular in the domain of electric and hybrid vehicles, is an important point. Indeed, the temperature of the battery must stay between 20° C. and 40° C. to ensure the reliability, range and performance of the vehicle and to optimize the service life of the battery.

In electric and hybrid vehicles, the battery usually comprises several electrical energy storage cells linked together to create an electrical voltage generator of the required capacity.

These electrical energy storage cells positioned in a protective casing form what is known as a battery pack. In order to regulate the temperature of the battery, it is known to use a thermal regulation device. The thermal regulation device includes a heat exchanger placed in contact with the battery at the bottom of the protective casing and through which flows a heat-transfer fluid.

The heat-transfer fluid can then absorb the heat emitted by each battery in order to cool same or, as required, it may add heat to same if the temperature of the battery is not high enough to ensure the correct operation of same.

In order to improve the heat exchange between the battery and the heat exchanger, the thermal regulation devices in the prior art propose positioning a spring between the plurality of pipes in the heat exchanger and the bottom of the protective casing of the battery pack. The spring pushes the pipes of the heat exchanger towards the battery pack, thereby improving contact between the pipes of the heat exchanger and the electrical energy storage cells resting on top.

However, the thermal spring of the battery pack in document DE 20 2012 102 969, being made as a single part for all of the pipes of the exchanger, is very voluminous and makes the battery pack bulky. Furthermore, the uniformity of the forces is realized along the length of the pipes of the heat exchanger. If the pipes of the heat exchanger are twisted along the length of same, this twisting cannot be corrected by the spring, and may even be increased. Furthermore, the spring, which is linked directly to the battery, makes it more difficult to change the battery.

Furthermore, none of the thermal regulation devices in the prior art addresses the problem of thermal conductivity between the different metal elements of the battery pack, which adversely affects the heat exchange between the battery and the heat exchanger or the problem of the corrosion risk caused by the galvanic effect between these different elements, which can cause failure of the battery.

The invention is intended to provide a thermal regulation device for a battery of a motor vehicle that mitigates one or more of the drawbacks in the prior art, optimizing manufacturing costs.

Accordingly, the invention relates to a thermal regulation device for a battery pack for a motor vehicle comprising at least one battery contained in a casing, the thermal regulation device comprising:
- at least one heat exchanger in contact with the battery,
- at least one elastic element arranged in the bottom of the casing in order to hold the heat exchanger against the battery, characterized in that an insulant is interposed between the elastic element and the heat exchanger.

Said thermal regulation device may also incorporate one or more of the following aspects, separately or in combination:

According to another aspect of the invention, the insulant is a molded plastic component, facilitating the assembly of same with the heat exchanger.

According to another aspect of the invention, the molded plastic component is made of polypropylene or polyamide reinforced with glass fiber, such as PA66-GF30, guaranteeing good thermal and electric insulation of the battery.

According to another aspect of the invention, in which the heat exchanger includes pipes, the insulant is attached to each pipe of the heat exchanger, enabling the fastenings of each of the pipes to be removed, thereby reducing the risk of poor contact related to the assembly precision of each element of the battery pack.

According to another aspect of the invention, the insulant covers the surface of the pipe that is opposite the surface that is in contact with the battery, improving the hold of the pipe and optimizing the thermal and electric insulation of the pipe.

According to another aspect of the invention, the molded plastic component includes elastic hooks for attaching the molded plastic component to the pipe, to improve the mechanical hold of the pipe.

According to another aspect of the invention, the insulant has spacers used to provide additional air-gap thermal insulation for the pipe.

According to another aspect of the invention, the spacers in the insulant include longitudinal ribs, improving the rigidity of the insulant.

According to another aspect of the invention, the elastic element has at least one spring component made of cut and folded metal sheet helping to optimize the manufacturing cost of the spring component.

According to another aspect of the invention, the spring component has a longitudinal rectangular shape with a U-shaped cross section, comprising a plurality of tapered support legs, the tops of which are parallel to the width of the spring component and form stiffening cross members, providing continuous support in the longitudinal and transverse directions of the pipe.

According to another aspect of the invention, the U-shaped free extremities of the spring component are folded towards one another to cooperate with the matching lateral grooves in the molded plastic component, thereby enabling a mechanical connection between the spring component and the molded plastic component.

According to another aspect of the invention, the spring component has a tapered shape in cross section, guaranteeing continuous support in the longitudinal and transverse directions of the pipe.

According to another aspect of the invention, the spring component has a longitudinal central trunk with a plurality of elastic support legs oriented towards the bottom of the casing of the battery pack. This cutout structure helps to reduce the weight of the spring component.

According to another aspect of the invention, the elastic support legs of the spring component are staggered on either side of the central trunk of said spring component. This variant embodiment helps to minimize the amount of material lost when cutting the spring component.

According to another aspect of the invention, the spring component includes assembly means for cooperating with the complementary assembly means of the molded plastic component connected to said spring component, thereby simplifying assembly of the two components without using adhesive.

According to another aspect of the invention, the complementary assembly means for the molded plastic component include lugs to enable sliding assembly of the two components.

According to another aspect of the invention, the complementary assembly means for the molded plastic component include dogs to enable sliding assembly of the two components.

According to another aspect of the invention, the complementary assembly means for the molded plastic component include elastic rods enabling attachment by clicking with the spring component.

Finally, the invention relates to a battery pack for a motor vehicle comprising a battery positioned in a casing, including a thermal regulation device as defined above.

Other characteristics and advantages of the invention are set out in greater detail in the description below, given by way of non-limiting example and the attached drawings, in which.

Figure 3A:
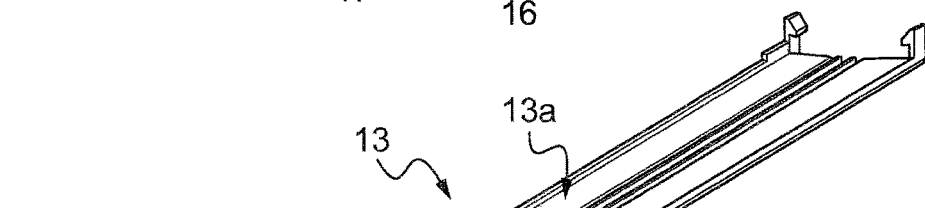
Figure 3B:
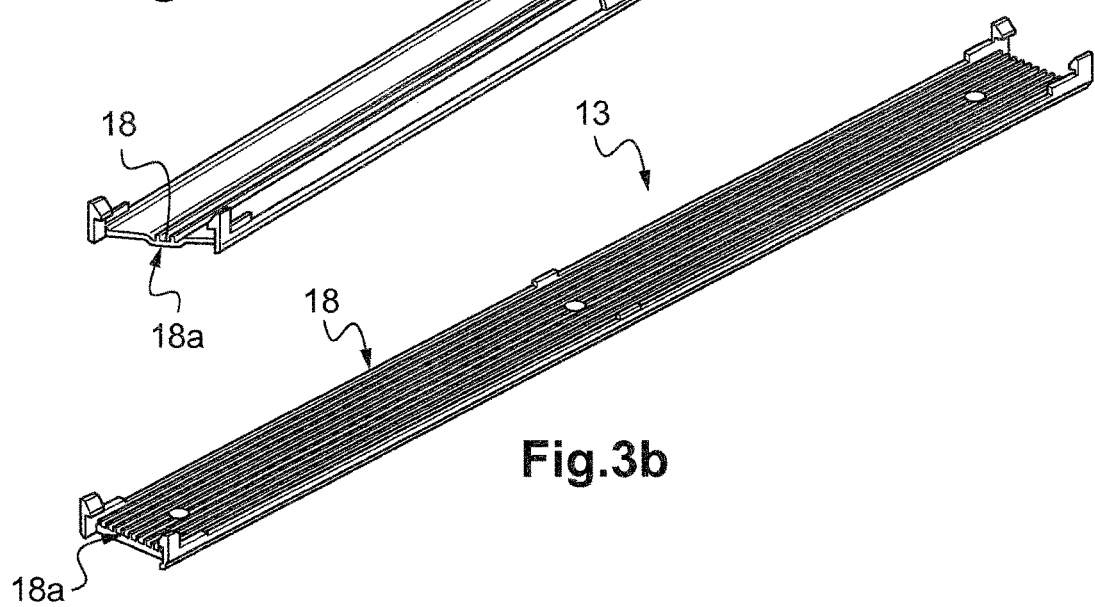
Figure 4:
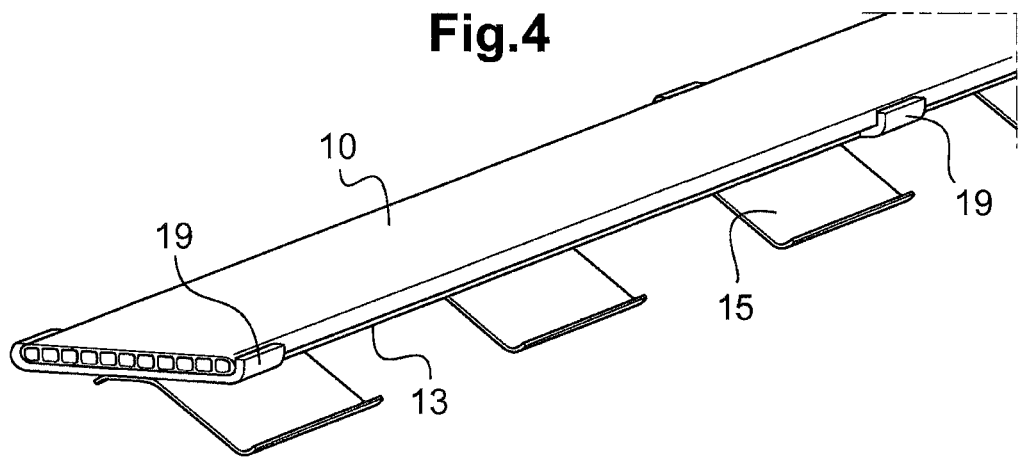
Figure 5:
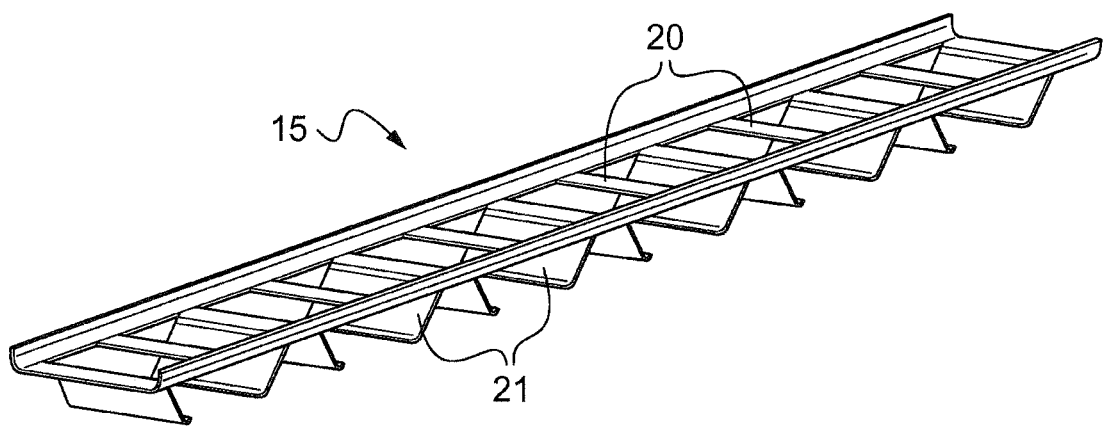
Figure 6:
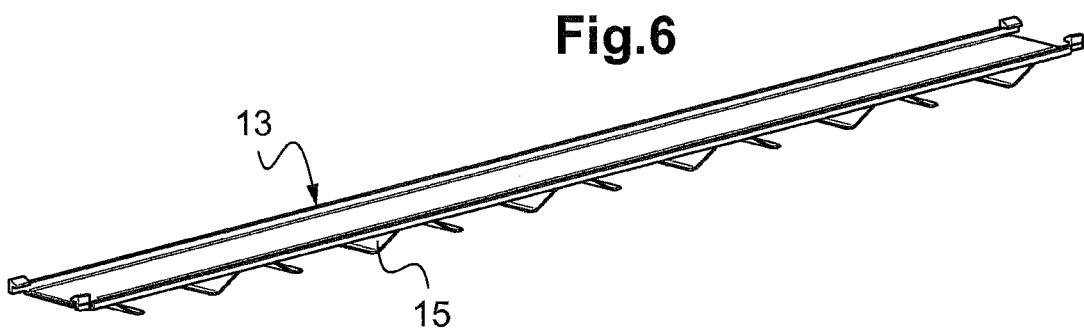
Figure 7:
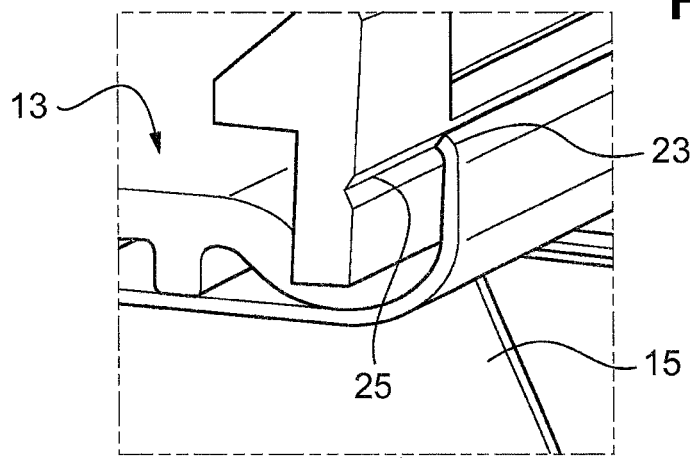
Figure 8:
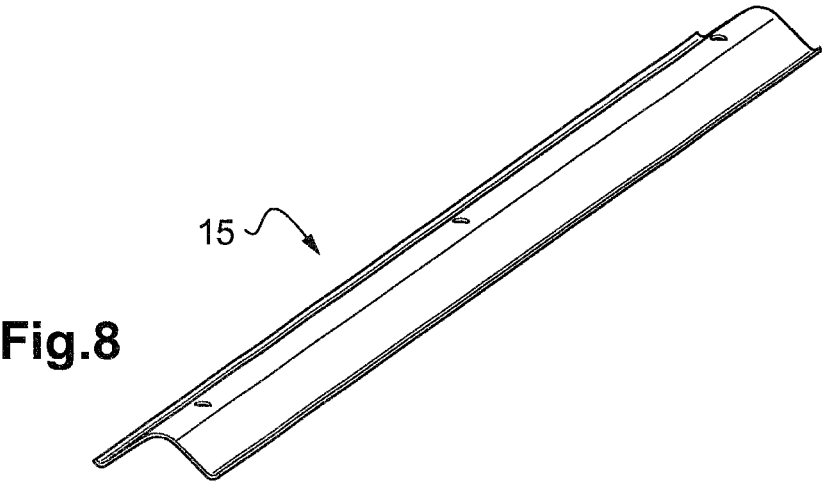
Figure 9:
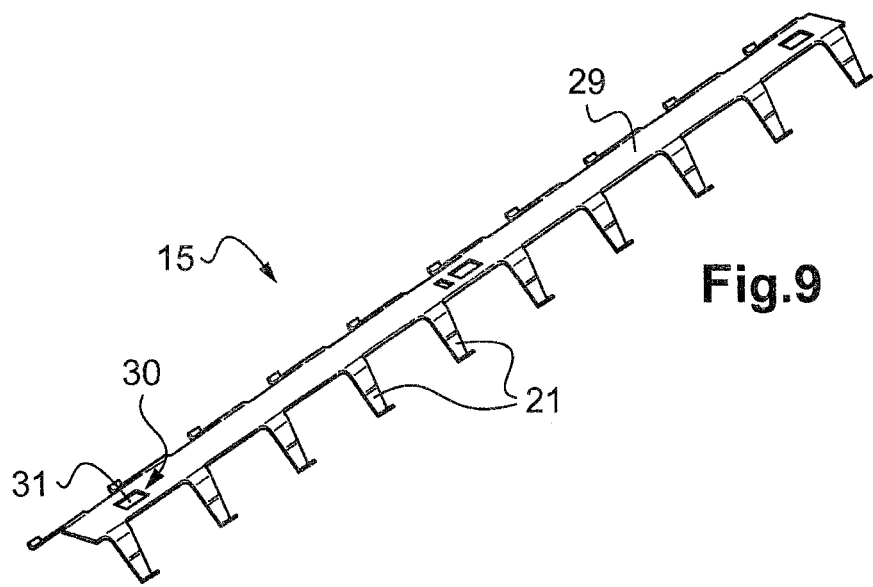
Figure 10A:
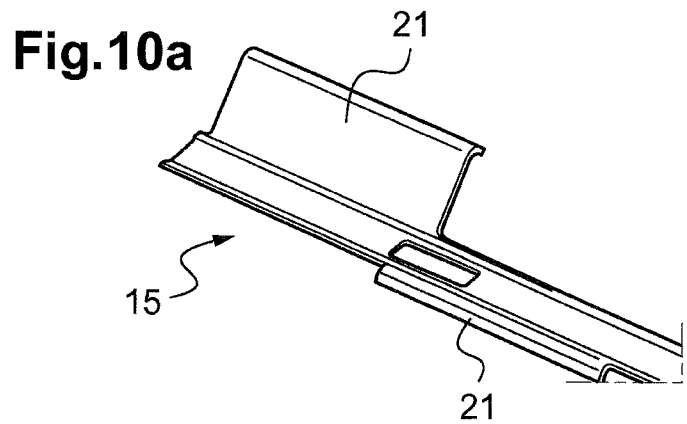
Figure 10B:
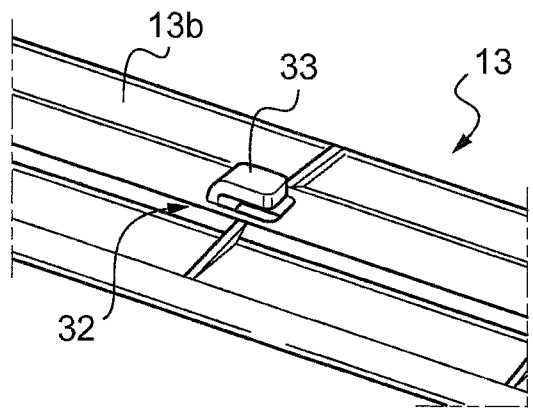
Figure 10C:
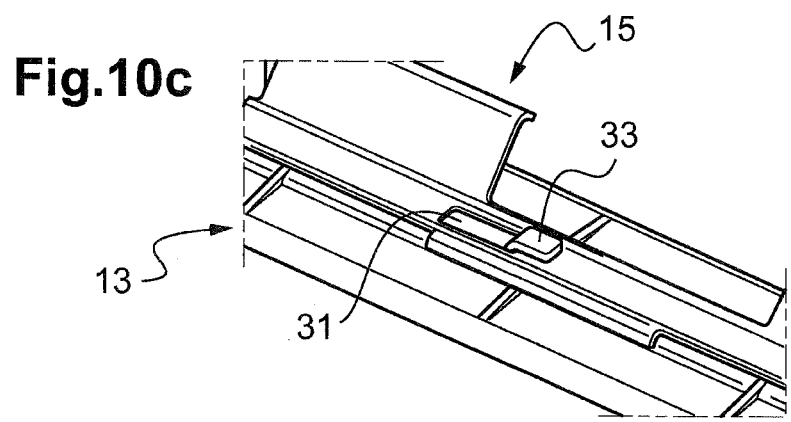

FIGS. 3a and 3b are perspective views of the molded plastic component according to variant embodiments, FIG. 4 is a perspective view of a pipe assembled with a molded plastic component and a spring component, FIG. 5 is a perspective view of the elastic element according to a first embodiment, FIG. 6 is a perspective view of the molded plastic component assembled with the spring component in FIG. 5, FIG. 7 is a detailed perspective view of the assembly of the molded plastic component with the spring component in FIG. 5, FIG. 8 is a perspective view of the spring component according to a second embodiment, FIG. 9 is a perspective view of the spring component according to a third embodiment, FIG. 10a is a perspective view of the spring component according to a fourth embodiment, FIGS. 10b and 10c are detailed schematic views of the means for assembling the molded plastic component with the spring component according to a first variant embodiment, FIGS. 11a, 11b and 11c are detailed schematic views of the means for assembling the molded plastic component with the spring component according to a second variant embodiment, FIGS. 12a and 12b are detailed schematic views of the means for assembling the molded plastic component with the spring component according to a third variant embodiment.

In all of these figures, identical elements have the same reference signs.

Figure 1:
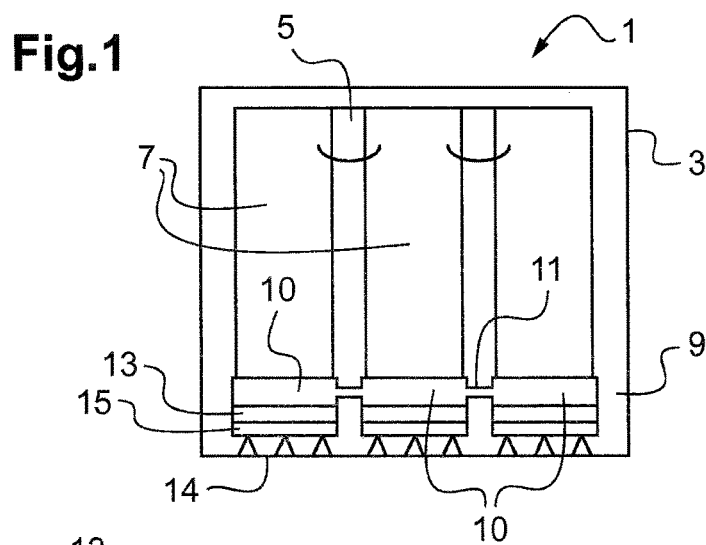
FIG. 1 is a schematic cross sectional side view of a battery pack.

FIG. 1 is a schematic cross sectional side view of a battery pack 1. The battery pack 1 has a casing 3 containing a battery 5, usually comprising one or more energy storage cells or accumulators 7 that are joined together in parallel or in series to create an electric voltage generator of the desired capacity.

The section of the energy storage cells 7 may be four-sided parallelepipeds. The battery 5 thus formed is a four-sided rectangular box.

Advantageously, if the battery has several storage cells, for example three storage cells as shown in FIG. 1, the heat exchanger 9 will have the same number of pipes 10. These pipes 10 are flat multi-channel pipes that are connected together by a manifold 11 enabling the heat-transfer fluid to be ducted.

Optimizing the number of pipes 10 to the number of energy storage cells 7 in the battery 5 helps to minimize the weight of the heat exchanger 9 and consequently the total weight of the battery pack 1.

An elastic element 15 is placed at the bottom 14 of the casing 3 of the battery pack 1 in order to hold the heat exchanger against the battery.

An insulant 13 is interposed between the elastic element 15 and the heat exchanger 9.

Advantageously, if the heat exchanger 9 has several pipes 10, an insulant 13 is provided for each pipe 10. This arrangement, enabling removal of the fastenings between each of the pipes 10 and the related insulant 13, reduces the risk of poor contact related to the assembly precision of each element.

The insulant 13 rests on the elastic element 15 and is mechanically attached to same, said elastic element 15 in turn resting on the bottom 14 of the casing 3. In the arrangement with several pipes 10, an elastic element 15 is attached to each insulant 13 assembled on each of the pipes 10.

The insulant 13 and the elastic element 15 thus form a supporting element, referred to as a "spring bar", for each pipe 10 in the heat exchanger 9 of the battery pack 1. The spring bar presses each pipe 10 against the battery 5 independently in order to reduce the weight and the cost of the overall solution.

Figure 2:
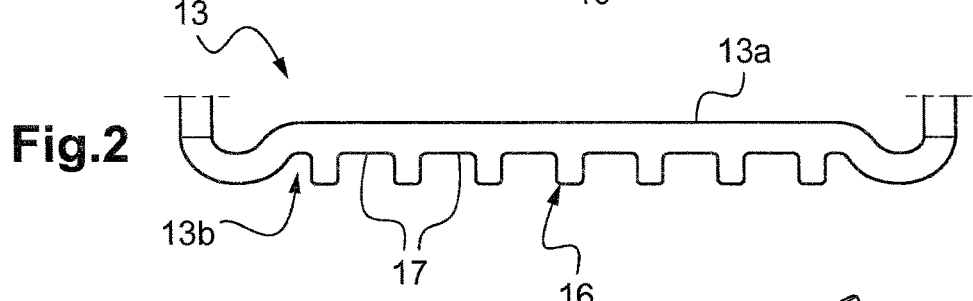
FIG. 2 is a cross sectional view of the insulant according to one embodiment.

FIG. 2 is a cross sectional view of the insulant 13 according to one example embodiment. Advantageously, the insulant 13 is a molded plastic component formed by plastic injection.

The molded plastic component 13 is made of plastic with low thermal conductivity. The plastic is for example polypropylene or polyamide reinforced with glass fiber, such as PA66-GF30, which is a plastic with average thermal conductivity but good creep resistance in stressed environments, whether said stresses be thermal or acidity. PA66-GF30 is polyamide 6.6 reinforced with 30% glass fibers. The molded plastic component 13 has an open U-shaped cross section designed to receive, on the upper face 13a of same, the pipe 10 of the heat exchanger 9.

As shown in FIG. 2, the molded plastic component 13 has spacers 16 on the lower face 13b of same, thereby providing supplementary air-gap thermal insulation for the pipe 10 in the interstices 17 between the spacers 16.

According to a variant embodiment shown in FIGS. 3a, 3b, said spacers 16 include longitudinal ribs 18 formed on the face 13a designed to be in contact with the pipe 10.

The longitudinal ribs 18 may also be formed on the lower face 13b or the upper face 13a of the molded plastic component 13. The longitudinal ribs 18 may partially cover the surface of the molded plastic component 13, as shown in FIG. 3a, or the whole of the surface, as shown in FIG. 3b.

According to FIG. 3a, the longitudinal ribs 18 extend along the entire length of the mid portion of the molded component 13.

These ribs 18 open out at the extremities 18a to enable the discharge of condensate.

According to another variant embodiment (not shown), the spacers 16 may be simple lugs projecting from the lower face 13b or from the upper face 13a of the molded plastic component 13.

The advantage of the longitudinal ribs 18 over the lugs is to improve the rigidity of the molded plastic component 13.

FIG. 4 is a perspective view of the pipe 10 assembled with a molded plastic component 13 and an elastic element 15. The molded plastic component 13 has elastic hooks 19 for attaching the molded plastic component 13 to the pipe 10. Said elastic hooks 19 are positioned at both extremities of the length of the molded plastic component 13 or at different points along the length of same and they pinch the radius of the pipes 10 such as to not extend beyond the surface of the pipe 10 in contact with the energy storage cell 7 of the battery 5.

Advantageously, the molded plastic component 13 covers the surface of the pipe 10 that is opposite the surface that is in contact with the battery 5, improving the hold of the pipe 10 and optimizing the thermal and electric insulation of the pipe 10.

The thickness of the molded plastic component 13 is between 1 and 1.5 mm to improve the rigidity of the component and the thermal insulating characteristics of same.

The molded plastic component 13 therefore has two functions: firstly it electrically insulates the heat exchanger 9 from the other metal elements in the battery pack, thereby obviating the risk of corrosion as a result of the galvanic effect between these elements, and secondly it thermally insulates the heat exchanger 9 from the other elements in the battery pack, thereby helping to optimize the desired heat exchange between the battery 5 and said heat exchanger 9.

FIG. 5 is a perspective view of the elastic element 15 according to a first embodiment.

The elastic element 15 is a spring component made of cut and folded sheet metal, for example stainless steel, of a thickness between 0.1 mm and 0.4 mm and ideally 0.2 mm and 0.3 mm according to commercial standards. The thickness of the spring component in commercial standards has been chosen carefully in order to guarantee an end-of-life compression force for the spring that is within the compression tolerances enabling sufficient compression force to continuously maintain contact between the heat exchanger 9 and the battery 5.

Furthermore, the choice of a standard material thickness helps to optimize the manufacturing costs of the spring component 15.

As shown in FIG. 5, the spring component 15 has a longitudinal rectangular shape with a U-shaped cross section that is cut to reduce the weight of the component while retaining the material required to guarantee the compression force to be transmitted to the molded plastic component 13 to which it is attached. The spring component 15 thus comprises a plurality of cross members 20 and support legs 21 distributed along the entire length of the spring component 15.

Identical tapered support legs 21 are distributed at regular intervals along the entire length of the spring component 15 and form stiffening cross members. The tops of the support legs are parallel to the width of the spring component 15. The distribution of the support legs 21 at regular intervals along the entire length of the spring component 15 provides a continuous support in the longitudinal and transverse directions of the pipe 10.

The neutral axis of each support leg 21 on the spring component 15 is specially drawn to match the desired compression force in all instances of battery clamping. The drawing of the neutral axis may be assimilated to the section of one of the springs in the nominal position of same. The drawing of the neutral axis of each spring is adapted specifically to the dimensional stresses of the whole of the component forming the battery pack. The drawing of the neutral axis also takes account of the chain of dimensions with and without compression, as well as the desired compression force. Desired compression force means the reactive force that does not exceed the clamping force of the different assembly elements for the battery pack as a whole.

As shown in FIG. 6, advantageously, the surface of the spring component 15 is equivalent to the contact surface of the molded plastic component 13 to which it is attached. This arrangement enables the spring component 15 to transmit a uniform compression force to the entire surface of the molded plastic component 13 to which it is attached. As shown in FIG. 7, the U-shaped free extremities 23 of the spring component 15 are folded towards one another to cooperate with the matching lateral grooves 25 in the molded plastic component 13, thereby enabling a mechanical connection between the spring component 15 and the molded plastic component 13. The two components are then assembled by clicking to one another. This type of assembly, which obviates the need to use a double-sided adhesive, helps to simplify assembly and therefore to reduce the manufacturing costs of the components. Any other type of assembly method, such as crimping, or any equivalent means that requires no adhesive can nonetheless be used.

Furthermore, the free extremities 23 of the spring component 15 that are folded towards one another provide the spring component 15 with the rigidity required, enhancing the uniformity of the compression force that is transmitted to the entire contact surface of the plastic component 13 to which it is attached.

According to a second embodiment shown in FIG. 8, the spring component 15 has a tapered cross section.

According to a third embodiment shown in FIG. 9, the spring component 15 has a longitudinal central trunk 29 with a plurality of elastic support legs 21 oriented towards the bottom of the casing 3 of the battery pack 1.

Said support legs 21 are arranged opposite one another on either side of the longitudinal central trunk 29 of the spring component 15, and at regular intervals along the entire length of the spring component 15. This cutout structure helps to reduce the weight of the spring component 15.

The central trunk 29 of the spring component 15 has a longitudinal rectangular shape and includes several assembly means 30 in the form of rectangular cutouts 31 distributed at regular intervals along the length of the spring component 15, the shape of which matches the assembly means 32 provided on the contact surface of the molded plastic component 13 to which it is attached.

FIG. 10a shows a fourth embodiment of the spring component 15, in which the support legs 21 are cut out in a staggered arrangement. This variant embodiment saves approximately one third of the material used for a spring bar designed for a single pipe 10 and minimizes the material used.

The cutting of the spring component 15 is intended to achieve an optimum balance between the weight of the spring component 15 and the uniformity of the compression force that same is required to transmit through the molded plastic component 13 to the pipe 10 in order to optimize the efficiency of the heat exchange between the pipe 10 and the energy storage cell 7 of the battery 5 with which it is in contact.

The spring component 15 thus designed is intended to guarantee contact between the pipe 10 and the energy storage cell 7 of the battery 5 with which it is in contact in all of the play conditions occurring during assembly of the different elements of the battery pack 1.

FIG. 10b shows the lower face 13b of the molded plastic component 13. The assembly means 32 of the molded plastic component 13 complementing the assembly means 30 provided on the spring component 15 according to the variant embodiment in which the spring component has several rectangular cutouts 31 are provided in the form of lugs 33.

As shown in FIG. 10c, the spring component 15 is assembled with the molded plastic component 13 by sliding the lugs 33 into the cutouts 31 in the spring component 15.

FIGS. 11a, 11b and 11c show a second variant embodiment of the assembly means of the molded plastic component 13 with the spring component 15. As shown in FIG. 11a, the assembly means 32 positioned on the lower face 13b of the molded plastic component 13 that is in contact with the spring component 15 include dogs 35 having a head 35a and a groove 35b at the base of same.

The complementary assembly means 30 provided on the spring component 15, as shown in FIGS. 11b and 11c, include oblong holes 41. The oblong holes 41 have two separate portions: one wide portion 41a enabling insertion of the head 35a of the dog 35 of the molded plastic component 13, and a second narrow portion 41b clamping the base of the dog once the groove 35b has been slid into the narrower portion 41b of the oblong hole 41.

FIGS. 12a, 12b show a third variant embodiment of the assembly means of the molded plastic component 13 with the spring component 15. As shown in FIG. 12a, the assembly means positioned on the lower face 13b of the molded plastic component 13 in contact with the spring component include elastic rods 43 enabling click attachment with the spring component 15.

The rods 43 are cut out in the lengthwise direction in two separate portions 43a and 43b that are adjacent to one another and separated by a space. The two portions 43a and 43b are provided in the form of a trunk 45 and a triangular head 47.

As shown in FIG. 12b, the complementary assembly means 30 provided on the spring component 15 include holes 49. The spring component 15 is assembled with the molded plastic component 13 by inserting the rods 43 into the holes 49. The head 47 of the rod 43 is inserted into the hole 49 by pinching the two portions 43a and 43b. Once inserted into the hole 49, releasing the two portions causes same to separate, such that the rods can be inserted into the holes but cannot be withdrawn from same accidentally.

The combined use of a molded plastic component 13 and a spring component 15 to improve contact between the pipes 10 of the heat exchanger 9 and the energy storage cells 7 of the battery 5 both guarantees good heat-exchange performance between the heat exchanger 9 and the battery 5 and also ensures the electrical insulation of the pipes 10 from other elements of the battery 5.

Furthermore, uncoupling the assembly of each of the pipes 10 to a molded plastic component 13 and a spring component 15 makes it possible not only to optimize the assembly precision of all of the components of the battery pack, but also to reduce the weight and manufacturing cost of the solution as a whole.

The invention claimed is:

1. A thermal regulation device for a battery pack for a motor vehicle comprising at least one battery contained in a casing, the thermal regulation device comprising:

at least one heat exchanger comprising a plurality of pipes in thermal contact with the at least one battery to conduct a heat-transfer fluid; and a plurality of elastic elements arranged in a bottom of the casing in order to hold the at least one heat exchanger against the at least one battery, wherein each of the plurality of elastic elements corresponds to one of the plurality of pipes and comprises at least one spring component made of sheet metal, wherein an insulant formed of a molded plastic component is interposed between each elastic element and a corresponding one of the plurality of pipes, wherein said each elastic element and the associated insulant collectively press the corresponding one of the plurality of pipes against the at least one battery independently of other pipes in the plurality of pipes, wherein the at least one spring component is in direct contact with the insulant, and wherein the at least one spring component includes assembly means to cooperate with the complementary assembly means of the molded plastic component to which the at least one spring component is attached.

2. The thermal regulation device for a battery pack for a motor vehicle as claimed in claim 1, wherein the molded plastic component is made of polypropylene or polyamide reinforced with glass fiber.

3. The thermal regulation device for a battery pack for a motor vehicle as claimed in claim 1, wherein the insulant is attached to the corresponding one of the plurality of pipes of the at least one heat exchanger.

4. The thermal regulation device for a battery pack for a motor vehicle as claimed in claim 3, wherein the insulant covers a surface of the corresponding one of the plurality of pipes opposite a surface of the corresponding one of the plurality of pipes that is in contact with the at least one battery.

5. The thermal regulation device for a battery pack for a motor vehicle as claimed in claim 3, wherein the molded plastic component has elastic hooks for attaching the molded plastic component to the corresponding one of the plurality of pipes.

6. The thermal regulation device for a battery pack for a motor vehicle as claimed in claim 3, wherein the insulant has spacers used to provide additional air-gap thermal insulation for the corresponding one of the plurality of pipes.

7. The thermal regulation device for a battery pack for a motor vehicle as claimed in claim 6, wherein the spacers of the insulant include longitudinal ribs.

8. The thermal regulation device for a battery pack for a motor vehicle as claimed in claim 1 wherein the at least one spring component is made of cut and folded sheet metal.

9. The thermal regulation device for a battery pack for a motor vehicle as claimed in claim 8, wherein the at least one spring component has a longitudinal rectangular shape with a U-shaped cross section, comprising a plurality of tapered support legs, the tops of which are parallel to the width of the at least one spring component and form stiffening cross members.

10. The thermal regulation device for a battery pack for a motor vehicle as claimed in claim 8, wherein the at least one spring component comprises U-shaped free extremities, and wherein the U-shaped free extremities are folded towards one another to cooperate with matching lateral grooves in the insulant formed by the molded plastic component, thereby enabling a mechanical connection between the at least one spring component and the molded plastic component.

11. The thermal regulation device for a battery pack for a motor vehicle as claimed in claim 8, wherein the cross section of the at least one spring component is tapered.

12. The thermal regulation device for a battery pack for a motor vehicle as claimed in claim 8, wherein the at least one spring component has a longitudinal central trunk with a plurality of elastic support legs oriented towards the bottom of the casing of the battery pack.

13. The thermal regulation device for a battery pack for a motor vehicle as claimed in claim 12, wherein the elastic support legs of the at least one spring component are staggered on either side of the central trunk of the at least one spring component.

14. A battery pack for a motor vehicle comprising:
a battery positioned in a casing; and
a thermal regulation device as claimed in claim 1.

* * * * *